Oct. 17, 1939.   J. H. SPANGLER   2,176,383
GEAR SHIFTING MECHANISM FOR MOTOR VEHICLES
Filed Jan. 30, 1937   4 Sheets-Sheet 1

Inventor:
John H. Spangler.
By Whiteley and Ruckman
Attorneys.

Oct. 17, 1939.　　　J. H. SPANGLER　　　2,176,383
GEAR SHIFTING MECHANISM FOR MOTOR VEHICLES
Filed Jan. 30, 1937　　　4 Sheets-Sheet 2

Inventor:
John H. Spangler.
By Whiteley and Ruckman
Attorneys

Oct. 17, 1939.   J. H. SPANGLER   2,176,383
GEAR SHIFTING MECHANISM FOR MOTOR VEHICLES
Filed Jan. 30, 1937   4 Sheets-Sheet 3

Inventor:
John H. Spangler.
By Whiteley and Ruckman
Attorneys.

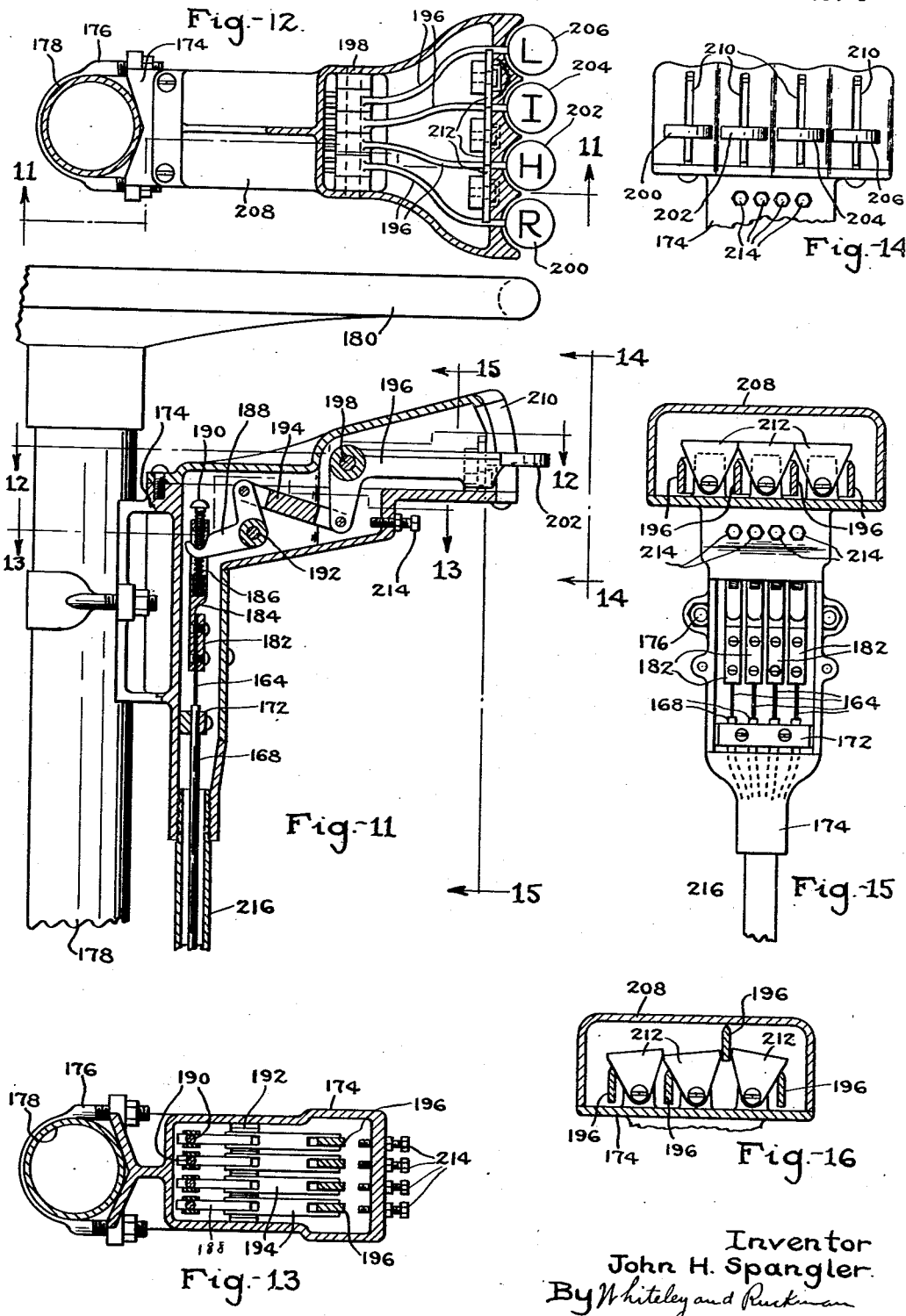

Patented Oct. 17, 1939

2,176,383

UNITED STATES PATENT OFFICE 2,176,383

GEAR SHIFTING MECHANISM FOR MOTOR VEHICLES

John H. Spangler, Minneapolis, Minn., assignor of one-half to H. G. Aplin, Minneapolis, Minn., and one-fifth to Alfred U. Hamrum, Minneapolis, Minn.

Application January 30, 1937, Serial No. 123,166

8 Claims. (Cl. 74—334)

My invention relates to gear shifting mechanism for motor vehicles. An object of the invention is to provide a construction in which the customary gear shifting lever is dispensed with and the shifting is obtained by operation of the clutch pedal. Another object is to provide a selective control device embodying finger buttons mounted on the steering post column adjacent the steering wheel or at some place within easy reach of the driver so that shifting may be readily accomplished by manipulating the proper finger button after depressing the clutch pedal and then allowing the latter to rise. Another object is to provide a device of this character in which only one button at a time can be operated and in which the shifting cannot be accomplished until any previously selected shift has been restored to neutral. Particular objects are to provide a mechanical gear shift of this character which is fool proof, easy to manipulate, compact and simple in construction, not affected by cold or other weather conditions, positive and accurate in operation, readily adaptable to any make of motor vehicle employing a gear shift, economical to manufacture, and durable in operation.

The novel features which I believe to be characteristic of my invention are set forth with particularity in the appended claims. The invention itself, however, both as to its organization and method of operation, together with additional objects and advantages will be best understood from the following description of a specific embodiment when read in connection with the accompanying drawings in which, Fig. 1 is a view substantially in central section on the line 1—1 of Fig. 5.

Fig. 11 is a view showing a finger button device in section on the line 11—11 of Fig. 12.

Fig. 12 is a view in section on the line 12—12 of Fig. 11.

Fig. 13 is a view in section on the line 13—13 of Fig. 11.

Fig. 14 is an elevation view showing the finger buttons as they appear from the line 14—14 of Fig. 11.

Fig. 15 is a view in section on the line 15—15 of Fig. 11 with a front cover plate removed.

Fig. 16 is a view of the upper part of what is shown in Fig. 15 but with one of the finger buttons pushed up.

Figure 1:
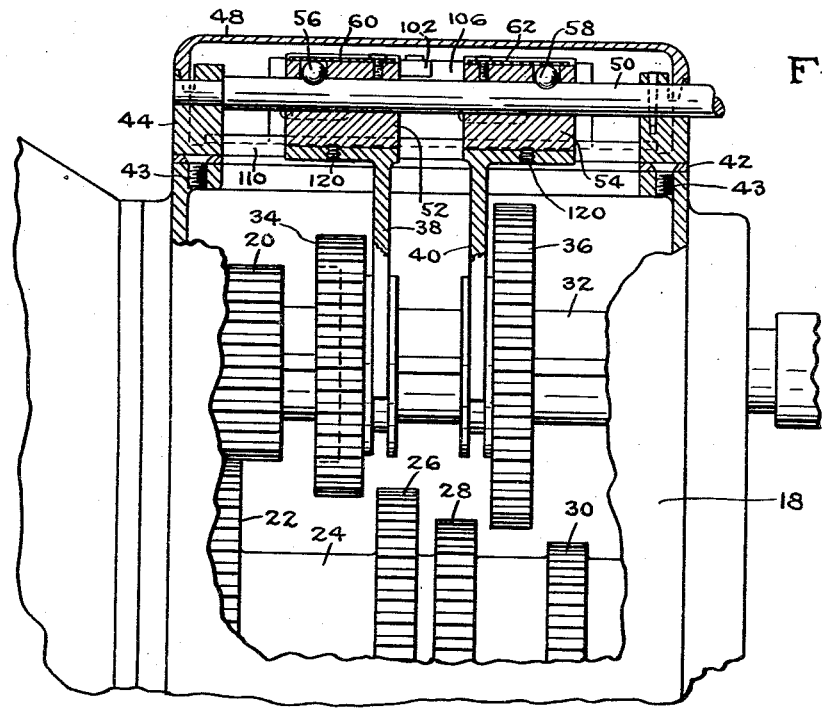

Referring first to Fig. 1, there is shown a transmission housing casing 18 into which extends the customary engine shaft having a gear 20 carried thereby. The gear 20 meshes with a gear 22 secured to a rotatable sleeve 24 to which are also secured an intermediate speed gear 26, a low speed gear 28 and a gear 30 associated with a reversing gearing in the usual manner. Associated with the engine shaft in the usual manner is a spline shaft 32 which in turn is associated with the propelling shaft. Carried by the spline shaft 32 is a gear 34 adapted to be shifted rearwardly into mesh with the intermediate gear 26 and to be shifted forwardly into clutching engagement with the gear 20 for driving directly from the engine shaft for high speed. Also carried by the spline shaft 32 is a gear 36 adapted to be shifted forwardly into mesh with this low gear 28 and to be shifted rearwardly into mesh with the idler gear of the reversing gearing. This transmission is of well-known construction and does not require further description. In regard to the engine shaft, it should be remembered that this shaft is in two parts normally connected by a clutch which is disengaged when the clutch pedal is depressed. The hub of the gear 34 is provided with a groove into which fits a shifting fork 38, while the hub of the gear 36 is provided with a groove into which fits a shifting fork 40.

In order to install my device the customary cover plate of the transmission casing 18 is removed and replaced by a metal gasket 42 secured in place by screw bolts 43. An instrument casing 44 containing operating elements of the gear shifting mechanism is secured to the gasket 42 by screw bolts 46 as will be understood from Figs. 3 and 5. The casing 44 has a removable cover 48 which in the plan view shown in Fig. 4 has been removed. Extending lengthwise through the casing 44 is a rod 50 upon which the hubs 52 and 54 of the forks 38 and 40 respectively are slidably mounted. In order to hold these hubs releasably in proper place on the rod 50, the hubs carry balls 56 and 58 respectively adapted to engage in notches in the rod and held resiliently by flat springs 60 and 62. As shown in Fig. 4, the rear end of the rod 50 projects out beyond the casing 44 and has a threaded end to which is attached a socket member 64 to which a lever 66 is intermediately pivoted by a pivot 68.

A rod 70 is attached at one end to the clutch pedal lever so as to be pulled by depression thereof and near its other end extends slidably through a sleeve 72. This end of the rod 70 is threaded and provided with adjustable nuts 74 and 76. The sleeve 72 is provided with an ear 78 which is attached to one arm of the lever 66 by a pivot 80. Attached to the pivot 80 is a socket member 82 which is internally threaded to receive the threaded end of a rod 84 which extends into the casing 44, the inner end of this rod being slidably supported in a tube 86 secured to the inner wall of the front of the casing 44. A coiled spring 88 normally holds the rod 84 in rearward position. A socket member 90 is attached to the other arm of the lever 66 by a pivot 92. The member 90 is internally threaded to receive the threaded end of a rod 94 which extends into the casing 44, the inner end of this rod being slidably supported in a tube 96 secured to the inner wall of the front of the casing 44. A coiled spring 98 normally holds the rod 94 in forward position. It will now be understood that when the clutch pedal is depressed, the rod 70 pulls the rod 84 forwardly against the tension of the spring 88 and at the same time pulls the rod 94 rearwardly against the tension of the spring 98.

Figure 2:
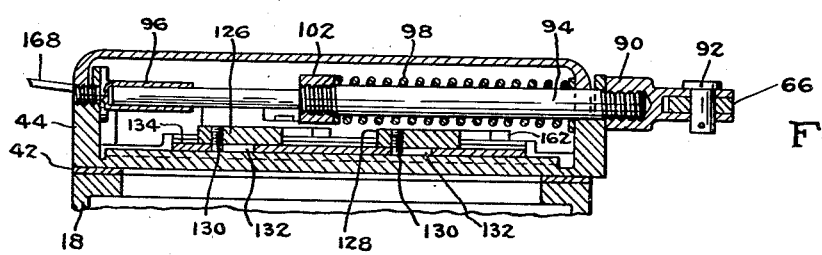
Fig. 2 is a view in section on the line 2—2 of Fig. 5.
Figure 3:
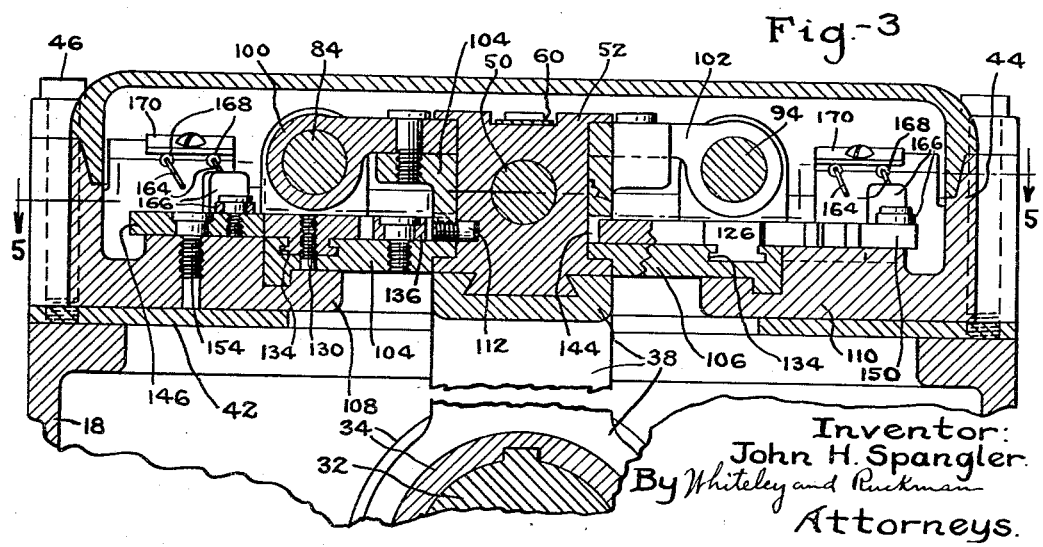
Fig. 3 is a view in section on the line 3—3 of Fig. 5 and on an enlarged scale.
Figure 4:
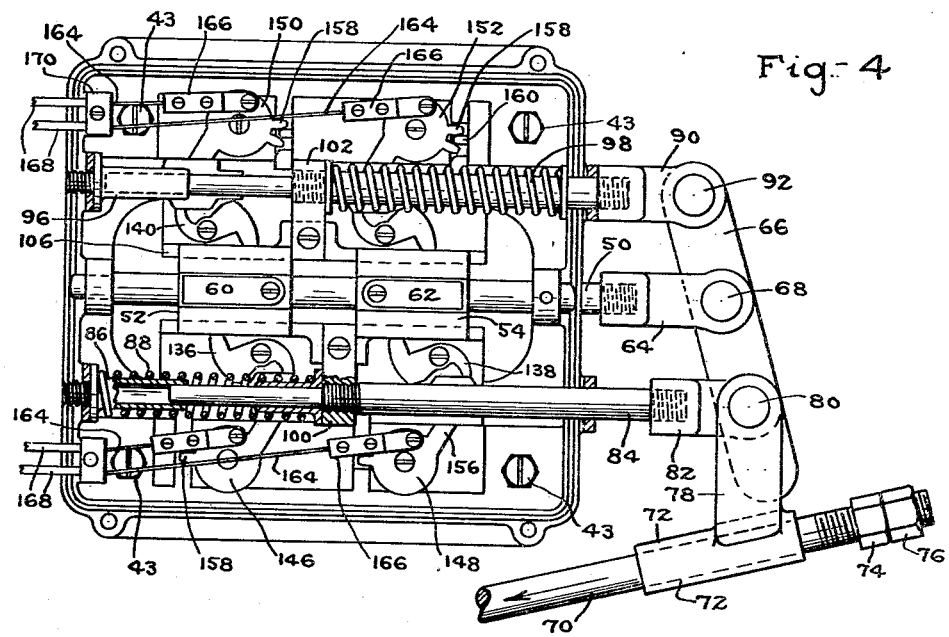
Fig. 4 is a top plan view of the device with the casing cover removed.
Figures 5, 6, 7:
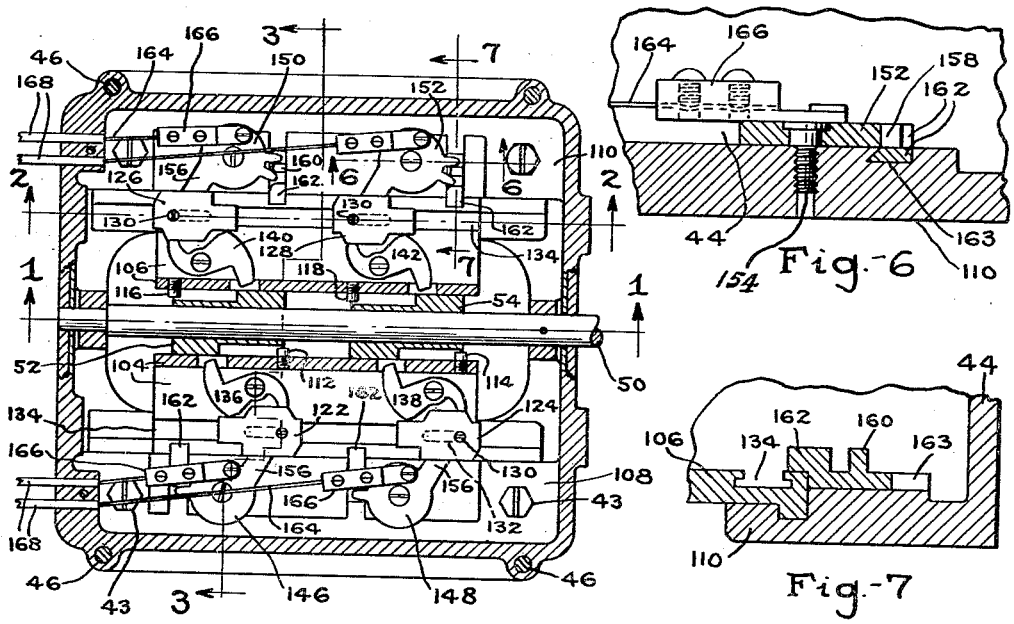
Fig. 5 is a view in section on the line 5—5 of Fig. 3 and on a smaller scale.
Fig. 6 is a view in section on the line 6—6 of Fig. 5 and on an enlarged scale.
Fig. 7 is a view on the line 7—7 of Fig. 5 and at right angles to Fig. 6.

By referring to Figs. 2, 3 and 4, it will be understood that the rod 84 is tapped through an ear 100 while the rod 94 is tapped through an ear 102. The ear 100 is carried by a sliding bar 104 while the ear 102 is carried by a similar sliding bar 106. These sliding bars are angular in shape as best shown in Fig. 3 and have depending flanges which fit into slideways in bars 108 and 110 respectively carried by the lower portion of the casing 44. The sliding bar 104 carries pins 112 and 114 which as shown in Fig. 5 fit into grooves formed in the rear portions of the hubs 52 and 54 respectively. The bar 106 carries pins 116 and 118 which fit into grooves formed in the forward portions of the hubs 52 and 54 respectively. It will be understood from Figs. 1 and 3, that the hubs 52 and 54 have downwardly extending dovetail projections which fit respectively into dovetail grooves in horizontal flanges carried by the forks 38 and 40 and are secured in properly adjusted position by set screws 120.

Figure 8:
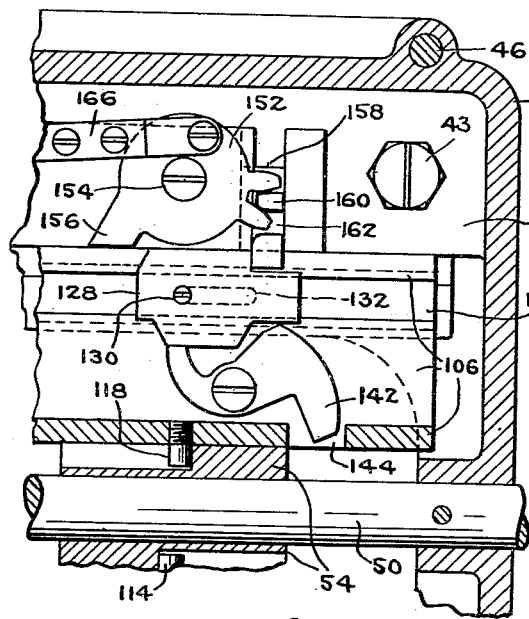
Fig. 8 is an enlarged view showing one of a number of hammers and dogs in the position they occupy after the clutch pedal has been pushed down ready for a finger button to be operated.
Figure 9:
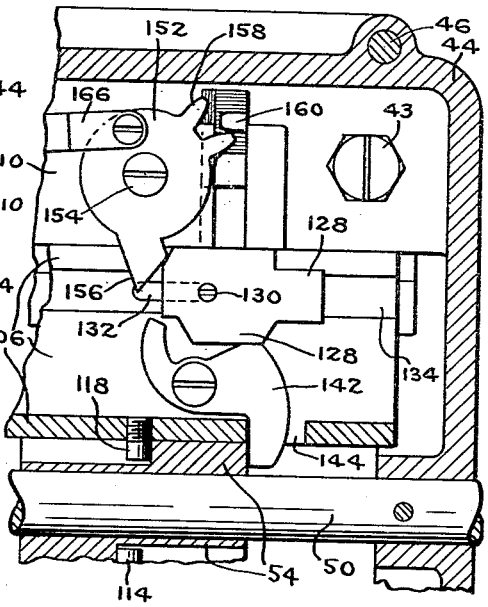
Fig. 9 shows the same parts in the position which they occupy after a finger button has been operated causing the dog to engage the rear end of the hub of a shifting fork to obtain low speed.
Figure 10:
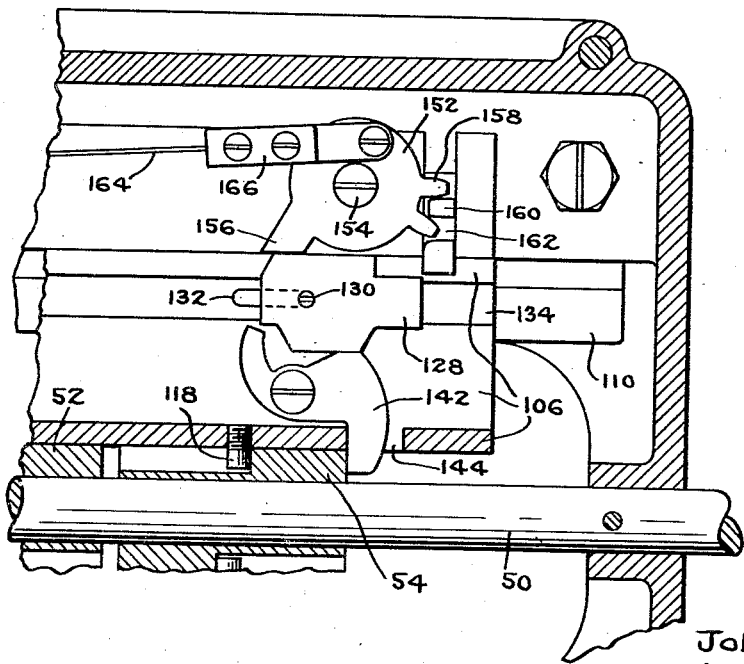
Fig. 10 shows the same parts in the position which they occupy after the clutch pedal has been released, so that the vehicle is now set for low speed.

It should now be explained that the sliding bar 104 carries cam slides 122 and 124 while the sliding bar 106 carries cam slides 126 and 128. These cam slides are provided with downwardly extending pins 130 which are received in slots 132 in the sliding bars, these slots limiting the extent of sliding movement of the cam slides. As best shown in Fig. 3, the cam slides have flanges on their lower sides which are adapted to work in undercut grooves 134 in the upper surface of the sliding bars whereby the cam slides are kept in proper position upon the sliding bars. The sliding bar 104 has dogs 136 and 138 pivotally attached thereto while the sliding bar 106 has dogs 140 and 142 pivotally attached thereto. One end of these dogs is adapted to be independently projected at proper times through slots 144 in the vertical flanges of the sliding bars. The pivoting movement of the dogs is caused by the cam slides and will be understood from Figs. 8, 9 and 10. As shown in Fig. 8, the clutch pedal has been depressed to move the sliding bar 106 rearwardly from the neutral position of Fig. 5, but the cam slide 128 is still holding the dog 142 out of the slot 144 while in Figs. 9 and 10, the cam slide 128 has projected this dog through the slot 144. In Fig. 9 the proper finger button has been operated to cause the dog 142 to engage the rear end of the hub 54 of the fork 40 when the clutch pedal is down. When the clutch pedal is released, the sliding bar 106 moves forwardly as shown in Fig. 10 and shifts the gear 36 into mesh with the low speed gear 28 as will be understood by reference to Fig. 1.

The manner in which the dogs 136, 138, 140 and 142 are independently operated will now be described. Co-operatively associated with these dogs are pivoted hammers 146, 148, 150 and 152 respectively. These hammers as will be understood in connection with the hammer 152 in Fig. 6, are pivotally attached to the lower portion of the casing 44 by pivot screws 154. Referring again to Figs. 8, 9 and 10, it will be noted that the hammers have projections 156 and also have pairs of teeth 158 which straddle projections 160 carried by slidable blocks 162 mounted for movement in an undercut groove 163 in the lower portion of the casing 44 as shown in Fig. 6. When a hammer such as the hammer 152 is given rotative movement in counter-clockwise direction from the position shown in Fig. 8, the block 162 is moved outwardly from engagement with a shoulder on the rear of the cam slide 128 and the projection 156 then engages the front of this cam slide and moves it into the position shown in Fig. 9, so that the cam portion of the slide engages the dog 142 and projects it through the slot 144 into engagement with the rear end of the fork hub 54. This movement occurs when the clutch pedal is fully depressed. When the clutch pedal is released, the sliding bar 106 due to its connection with the rod 94 and the expansion of the spring 98 causes the hub 54 to be moved forwardly into the position of Fig. 10. It is to be noted that when the sliding bar 106 carries the cam slide forward into this position, the front end of the slide engages the projection 156 and moves the hammer back to original position, and also that the slide is carried under the hammer so that it cannot be again operated until the clutch pedal is again depressed.

In order to give the hammers 146, 148, 150 and 152 the proper rotative movement, wires 164 are attached thereto by clamps 166 in a manner shown in Fig. 6. These wires pass slidably through tubes 168 whose lower ends are secured in clamps 170. The upper ends of the tubes 168 as shown in Fig. 11 are secured in a clamp 172 carried by a depending portion of a finger button support designated in general by the numeral 174. This support is provided with a clamp 176 for securing it in desired adjusted position to the column 178 through which extends the shaft which carries the steering wheel 180 at its upper end. The finger button support may thus be adjusted so as to accommodate it for either right or left handed drivers. The upper ends of the wires 164 are secured by clamps 182 to vertically movable members 184 constructed as best shown in Fig. 11. These members are provided with sockets which receive the lower ends of coiled springs 186 the upper ends of which impinge on the lower surfaces of one arm of bell crank levers 188. The members 184 are provided with screws 190 whose lower ends rest in notches in the said arm. By turning the screws 190 down, slack in the wires 164 may be taken up. The bell cranks 188 are pivoted to the support at 192 and their upper arms are connected by links 194 to inner arms of bell crank levers 196 which are pivoted to the support at 198. The other arms of the bell cranks 196 are spread apart as shown in Fig. 12 and at their rear ends carry finger buttons 200, 202, 204, and 206 marked R, H, I, and L respectively to designate reverse, high, intermediate, and low. It is apparent that when any one of these finger buttons is pushed upwardly, the associated wire 164 is drawn upwardly to turn the corresponding one of the hammers in the manner previously described. The support 174 is provided with a cover 208 the rear of which is turned downwardly and provided with vertical slots 210 in which the lever arms 196 move up and down.

Pivotally attached to the support 174 between the lever arms 196 are triangular pieces 212 which normally fill the spaces between these arms as shown in Fig. 15. When any one of the finger buttons is pushed upwardly, the associated lever arm 196 turns the pieces 212 upon their pivots. For instance if the button 204 is moved up, its arm 196 moves the pieces 212 into the position shown in Fig. 16, so that no other button can be moved up until the button 204 drops. It is apparent also that if an attempt be made to push up any two buttons at the same time, this cannot be done. It will, therefore be seen that the device is absolutely fool-proof since only one shift can be operated at a time and further if the engine is idling, none of the finger buttons can be accidentally pushed up, since the clutch pedal must first be depressed before any of the hammers 146, 148, 150 or 152 can be moved out of the position shown in Fig. 5. By referring to Figs. 11 and 13, it will be seen that the rear of the support 174 is provided with adjustable screw bolts 214 in order to determine the proper extent to which the finger buttons may be pushed up. A conduit 216 extends down from the support 174 for enclosing the tubes 168 which carry the wires 164.

The operation and advantages of my invention will be understood in connection with the foregoing description and the accompanying drawings. Every time that the clutch pedal is fully depressed and none of the finger buttons have been pushed up, all of the shifting parts are brought into neutral, if not already in that position. In order to operate the motor vehicle, the operator takes hold of the steering wheel and after depressing the clutch pedal, pushes up the button corresponding to the desired shift. The clutch pedal is then allowed to come up by the action of the customary spring associated therewith whereupon by the movement of the pedal and elements operated thereby, the selected shift is made and the button which was pushed up is automatically restored to its down position. In driving along, the driver may quickly change from any speed to any other speed without slowing or stopping the vehicle by merely pushing up the proper button, after depressing the clutch pedal, and allowing it to come up. It is impossible to push up two buttons since if it is attempted to do this, they lock and cannot be operated. If it is desired to stop the vehicle, it is merely necessary to push the clutch pedal fully down and allow it to come up without touching any button, the brakes of course being operated. It will be understood, of course, that the shift for reverse should not be made while the vehicle is travelling forward at a high rate of speed. At any time it is desired to slow down, the clutch pedal may be only partly depressed while the brakes are operated, and upon releasing the pedal, the same speed previously selected will be automatically picked. The working parts of the device are constantly being lubricated from the gears of the transmission and hence are not subjected to wear.

The manner in which the device is set for low speed has already been fully set forth in connection with the description of Figs. 8, 9 and 10. The device is set in similar manner for other speeds and for reverse by means of the proper button. The button marked L is connected by its wire with the hammer 152 at the upper right in Fig. 5 and low speed is obtained in the manner previously stated. The button marked H is connected by its wire with the hammer at the upper left in this figure. When the button is operated, the hub 52 is moved forwardly and the gear 34 is moved into clutching engagement with the gear 20. The button marked I is connected by its wire with the hammer at the lower left in Fig. 5. When this button is operated, the hub 52 is moved rearwardly and the gear 34 is moved into mesh with the intermediate gear 26. The button marked R is connected by its wire with the hammer at the lower right in this figure. When this button is operated, the hub 54 is moved rearwardly and the gear 36 is brought into mesh with the customary idler gear of the reversing mechanism. The purpose of the pins 112, 114, 116 and 118 will now be apparent in connection with Figs. 4 and 5. Assuming that the sliding bar 106 has been operated after the device is set for low speed, the pin 118 is left in engagement with the hub 54 as shown in Fig. 10. Now if the clutch pedal is fully depressed, the sliding bar is again moved rearwardly and the engagement of pin 118 with the hub 54 moves the gear 36 rearwardly out of mesh with the gear 28. It will, of course, be noted that when the shift for low is being made, the dog 142 is not projected through the slot 144 until the cam member 128 has been slid upon the sliding bar from its position thereon in Fig. 8 into its position in Fig. 9. Until this occurs, the dog is locked out as shown in Fig. 8. A similar action occurs in regard to the pins 112, 114 and 116.

Figure 4 shows the position of the rod 70 when the clutch pedal is in its uppermost position with the associated clutch in complete engaged position. In this position of the rod 70, the nut 74 occupies a position spaced rearwardly from the sleeve 72 and through which the rod will have a certain amount of sliding movement until the nut 74 comes into engagement with the sleeve 72. The loose movement thus provided is sufficient to permit the clutch to become disengaged before the sliding bar device is operated by further depression of the clutch pedal. When the clutch pedal is allowed to come up, the springs 88 and 98 restore the sliding bar device to original position and the engagement of the clutch is not made until the nut 74 moves backward from its engagement with the sleeve 72 into the position shown in Fig. 4. In other words, the selected gear is completely shifted before the clutch takes hold. If for any reason the brakes should not hold, it is apparent that the transmission can be quickly put into low to serve as a brake. The transmission can also be quickly put into reverse. By referring again to Figure 4, it is apparent that by lengthening or shortening the connection of the rod 50 with the lever 66, provision may be readily made for any longer or shorter throw required for different transmissions.

Although I have shown and described a specific embodiment of my invention, I am fully aware that other embodiments are possible. My invention, therefore, is not to be restricted except insofar as is necessitated by the prior art and by the spirit of the following claims.

I claim:

1. In a gear shifting mechanism for motor vehicles, the combination of a casing adapted to be associated with the transmission housing of the vehicle, a pair of sliding bars supported in said casing, yielding means tending to hold one of said bars forwardly and the other one rearwardly, connections between the clutch lever of the vehicle and said sliding bars for moving the latter in opposition to said yielding means when the clutch pedal of the vehicle is depressed, gear shifting forks having slidably mounted hubs, movable members carried by said sliding bars normally out of engagement with said hubs, finger buttons within easy reach of the driver, and connections extending between said buttons and said movable members for engaging the latter with said hubs whereby the gears in said transmission housing may be selectively shifted by depression of the clutch pedal.

2. In a gear shifting mechanism for motor vehicles, the combination of a casing adapted to be associated with the transmission housing of the vehicle, a pair of sliding bars supported in said casing, yielding means tending to hold one of said bars forwardly and the other one rearwardly, connections between the clutch lever of the vehicle and said sliding bars for moving the latter in opposition to said yielding means when the clutch pedal of the vehicle is depressed, cam slides carried by said sliding bars and having limited sliding movement thereon, gear shifting forks having slidably mounted hubs, dogs pivotally attached to said sliding bars and adapted to be moved into engagement with said hubs by said cam slides, finger buttons within easy reach of the driver, and connections extending between said buttons and said cam slides whereby the gears in said transmission housing may be selectively shifted by depression of the clutch pedal.

3. In a gear shifting mechanism for motor vehicles, the combination of a casing adapted to be associated with the transmission housing of the vehicle, a pair of sliding bars supported in said casing, yielding means tending to hold one of said bars forwardly and the other one rearwardly, a lever associated with said sliding bars for moving them in opposition to said yielding means, connections between the clutch lever of the vehicle and said lever for operating the latter when the clutch pedal of the vehicle is depressed, cam slides carried by said sliding bars and having limited sliding movement thereon, gear shifting forks having slidably mounted hubs, dogs pivotally attached to said sliding bars and adapted to be moved into engagement with said hubs by said cam slides, pivoted hammers mounted on said casing for giving sliding movement to said cam slides, finger buttons within easy reach of the driver, and connections between said finger buttons and said pivoted hammers whereby the gears in said transmission housing may be selectively shifted by depression of the clutch pedal.

4. In a gear shifting mechanism for motor vehicles, the combination of a casing adapted to be mounted on the transmission housing of the vehicle, a fixed rod extending longitudinally through said casing, gear shifting forks having hubs slidably carried by said rod, a pair of slidable rods one on each side of said fixed rod, springs tending to hold one of said rods forwardly and the other one rearwardly, a lever intermediately pivoted at the rear of said casing, said slidable rods being pivotally attached to opposite arms of said lever connections between the clutch lever of the vehicle and said intermediately pivoted lever whereby the latter is turned on its pivot in opposition to said springs when the clutch pedal of the vehicle is depressed, sliding bars attached to said pair of rods respectively, cam slides carried by said sliding bars and having limited sliding movement thereon, dogs pivotally attached to said sliding bars and adapted to be moved into engagement with said hubs by said cam slides, finger buttons within easy reach of the driver, and connections extending between said buttons and said cam slides whereby the gears in said transmission housing may be selectively shifted by depression of the clutch pedal.

5. In a gear shifting mechanism for motor vehicles, the combination of a casing adapted to be mounted on the transmission housing of the vehicle, a fixed rod extending longitudinally through said casing, gear shifting forks having hubs slidably carried by said rod, a pair of slidable rods one on each side of said fixed rod, springs tending to hold one of said rods forwardly and the other one rearwardly, said fixed rod being extended rearwardly from said casing, a lever intermediately pivoted on said extension, said slidable rods being pivotally attached to opposite arms of said lever, a rod extending from the clutch lever of the vehicle and having a connection with one arm of said intermediately pivoted lever whereby the latter is turned on its pivot in opposition to said springs when the clutch pedal of the vehicle is depressed, sliding bars attached to said pair of rods respectively, cam slides carried by said sliding bars and having limited sliding movement thereon, dogs pivotally attached to said sliding bars and adapted to be moved into engagement with said hubs by said cam slides, pivoted hammers mounted on said casing for giving sliding movement to said cam slides, a support mounted within easy reach of the driver, finger buttons carried by said support, and flexible connections between said finger buttons and said pivoted hammers whereby the gears in said transmission housing may be selectively shifted by depression of the clutch pedal.

6. In a gear shifting mechanism for motor vehicles, the combination of a casing adapted to be mounted on the transmission housing of the vehicle, a fixed rod extending longitudinally through said casing, gear shifting forks having hubs slidably carried by said rod, a pair of slidable rods, one on each side of said fixed rod, springs tending to hold one of said rods forwardly and the other one rearwardly, said fixed rod being extended rearwardly from said casing, a lever intermediately pivoted on said extension, said slidable rods being pivotally attached to opposite arms of said lever, a rod extending from the clutch lever of the vehicle and having a connection with one arm of said intermediately pivoted lever whereby the latter is turned on its pivot in opposition to said springs when the clutch pedal of the vehicle is fully depressed, said connection being provided with lost motion whereby considerable movement of said clutch pedal occurs before said intermediately pivoted lever is operated, sliding bars attached to said pair of rods respectively, pins carried by said bars which work in grooves formed in said hubs, cam slides carried by said sliding bars and having limited sliding movement thereon, dogs pivotally attached to said sliding bars and adapted to be moved into engagement with said hubs by said cam slides, pivoted hammers mounted on said casing for giving sliding movement to said cam slides, a support mounted within easy reach of the driver, finger buttons carried by said support, and flexible connections between said finger buttons and said pivoted hammers whereby the gears in said transmission housing may be selectively shifted by depression of the clutch pedal.

7. In a device of the character described, the combination of a casing associated with the transmission housing of a motor vehicle, speed changing mechanism in said housing, a pair of sliding bars supported in said casing, yielding means tending to hold one of said bars forwardly and the other one rearwardly, connections between the clutch lever of the vehicle and said sliding bars for moving the latter in opposition to said yielding means when the clutch pedal of the vehicle is depressed, slidably mounted arms, movable members carried by said sliding bars normally out of engagement with said arms, a support mounted within easy reach of the driver, levers pivotally mounted on said support, finger buttons on the outer ends of said levers, obstructing members pivoted to said support and located between said levers for movement thereby to prevent operation of more than one lever at a time, and connections extending between said levers and said movable members for engaging the latter with said arms respectively, whereby said speed changing mechanism may be selectively operated upon depression of the clutch pedal.

8. In a device of the character described, the combination of a casing associated with the transmission housing of a motor vehicle, speed changing mechanism in said housing, a pair of sliding bars supported in said casing, yielding means tending to hold one of said bars forwardly and the other one rearwardly, connections between the clutch lever of the vehicle and said sliding bars for moving the latter in opposition to said yielding means when the clutch pedal of the vehicle is depressed, slidably mounted arms, movable members carried by said sliding bars normally out of engagement with said arms, wires adapted to cause operation of said movable members for engaging said arms, a support within easy reach of the driver, vertically movable members associated with said support and to which said wires respectively are attached, lever systems carried by said support, springs carried by said vertically movable members and impinging the lower sides of one end of said lever systems respectively, screws carried by said vertically movable members and engaging the upper sides of said end of the lever systems respectively, whereby said wires are tightened by turning down said screws, and finger buttons carried by the other end of said lever systems respectively, whereby said speed changing mechanism may be selectively operated upon depression of the clutch pedal.

JOHN H. SPANGLER.